No. 681,107. Patented Aug. 20, 1901.
A. H. COWLES.
ELECTRIC FURNACE.
(Application filed Nov. 24, 1899. Renewed July 22, 1901.)
(No Model.)
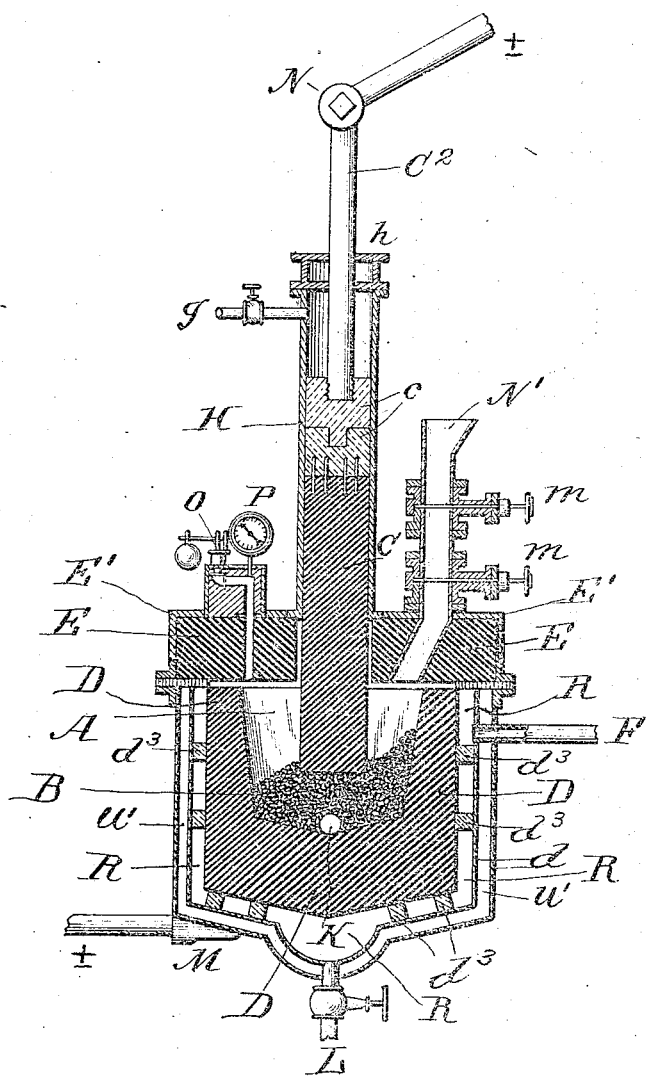

UNITED STATES PATENT OFFICE.

ALFRED H. COWLES, OF CLEVELAND, OHIO, ASSIGNOR TO THE ELECTRIC SMELTING AND ALUMINUM CO., OF SAME PLACE.

ELECTRIC FURNACE.

SPECIFICATION forming part of Letters Patent No. 681,107, dated August 20, 1901.

Original application filed July 20, 1895, Serial No. 557,172. Divided and this application filed November 24, 1899. Renewed July 22, 1901. Serial No. 69,315. (No model.)

*To all whom it may concern:*

Be it known that I, ALFRED H. COWLES, a citizen of the United States, residing at Cleveland, in the county of Cuyahoga and State of Ohio, have invented certain new and useful Improvements in Electric Furnaces, of which the following is a specification.

This invention relates to electric furnaces, and particularly to the electric furnace disclosed in my process of reducing sodium compounds, application filed in the United States Patent Office July 20, 1895, Serial No. 557,172, of which this application is a division and upon which furnace this application is based.

The specific arrangement of the electrode herein shown is covered by my application filed August 30, 1900, Serial No. 28,606.

The object of this invention is to provide an electric furnace specially fitted for reducing sodium compounds and for carrying out the process covered by the aforesaid application and capable of general electric-furnace uses.

A further object of the invention is to provide an electric furnace which will free the metal or discharge it in a gaseous condition from the furnace-chamber through the porous or permeable wall of said chamber into a room or compartment or into or against a condensing or cooling chamber upon or in connection with the exterior of the furnace-chamber.

In the accompanying drawing, forming part of this application, the figure is a central vertical section.

The same letters of reference denote the same parts.

A denotes the furnace-chamber, the walls and hearth of which are composed of compacted but porous carbon or hard compacted carbon in which are arranged blocks or masses of porous carbon or charcoal permeable to the gases and vapors evolved during the operation of the furnace.

B denotes the ore charge, hereinafter to be described.

C indicates the carbon electrode, attached to a rod $C^2$ by means of an intermediate metallic plug or plugs $c$ and having suitable connection with the electric circuit generated by a dynamo or other continuous or alternated current.

D indicates the carbon walls and hearth of the furnace, the material of which is porous or permeable to permit gases or vapors to pass therethrough from the furnace-chamber, but which is non-permeable to floating bodies. Inclosing the carbon walls and the hearth is a metallic double-walled jacket or casing $d$, which forms a water or air chamber $u'$, provided with suitable water or air inlet and outlet pipes, (not shown,) and the inner wall of the jacket $d$ is held away from the carbon wall D by metallic blocks or stays $d^3$ to prevent the said inner wall of the jacket from becoming heated to too great a temperature and to form a condensing space or chamber R between the jacket and the walls D, into which the gases and vapor are discharged through the numerous pores or openings in the walls and hearth D for condensation therein. The office of the water or air jacket is to maintain the temperature of the condensing-space at the proper temperature to effect condensation of the fumes or vapor discharged thereinto, as above noted. An exhaust-pipe F extends from the upper part of the condensing-space through the jacket $d$, through which pipe the carbonic oxid generated in the operation is passed off, assisted, if need be, by a suction-blower or equivalent device, (not shown,) which may be attached to the pipe F. At the bottom of the furnace-chamber a tap-hole K is provided, and the bottom of the jacket $d$ is provided with a discharge-pipe L for drawing off the condensed sodium from the condensing space or chamber.

The top of the furnace-chamber is preferably made separable from the main body of the furnace and is internally lined with compacted carbon E and incased outwardly by an iron shell E', a suitable layer of insulating material being placed between the cover and body of the furnace, as shown in the drawing. The electrode C, passing through the cover of the furnace, plays in a pipe H, connected to but insulated from the metallic casing of the cover. At the top of the pipe H is a stuffing-box $h$, through which the rod $C^2$ passes practically gas-tight. One of the electrode-terminals is attached to the outer metal casing or jacket $d$ at M and the other to the rod $C^2$ at N. Although not strictly essential, I prefer to connect an inlet-pipe $g$ to the upper part of the pipe H, through which, if found necessary or desirable, a small quantity of hydrocarbon or reducing gas or gas-forming liquid may be passed into the upper part of the pipe H, which will prevent any small amount of sodium from passing up as vapor around the electrode $C^2$. A sufficient amount of the hydrocarbon gas can be admitted to maintain a slight escape thereof down around the said electrode. For feeding the ore charge to the furnace a hopper N', having valves $m$, is located at the top of the furnace, and the latter is provided with a safety-valve O and a pressure-gage P.

One of the cables for the electric current is attached to the outer wall of the water-jacket $d$ at any desired point, and the course of the current is from the circuit-cable connected with the electrode C through the charge, the walls of the furnace-chamber, the stay-blocks, and the casing or water-jacket to the other circuit-terminal.

As hereinbefore stated, this furnace is especially applicable to the reduction of the class of compounds of which aluminate of soda ($Na_2Al_2O_4$) is a type, yet it is quite as applicable to other classes of reductions where salts are to be electrolized, and I wish it to be distinctly understood that its application is unlimited.

Taking aluminate of soda as a typical compound, the operation of the furnace is as follows: Take a mixture of aluminate of soda with coke or carbon in any form, forming such mixture either by mixing the crushed, ground, or granulated materials or by forming a mass of sodic aluminate saturated with a hydrocarbon and baked, and, if need be, crushed, or by mixing the aluminate of soda with carbon and coal-tar or pitch or equivalent carbonaceous matter, it being desirable that the ore charge should not be too powdery in consistence and it being also preferable, except when carbids are being formed, that no excess of carbon above the amount necessary for the reduction should be employed, since such excess will accumulate in the furnace and may need to be removed. The charge mixture is fed through the hopper into the furnace in successive portion, regulated according to the judgment of the operator by the temperature and pressure of the furnace. If the ore charge is fed too slowly, the furnace will become too hot, which will be indicated to the operator not only by the noticeable increase of temperature of the furnace and the water discharging from the water-jacket, but also by the diminished amount of carbonic oxid passing off. If the charge is fed too fast, there will accumulate in the furnace a mass of fused unreduced alumina, which will be observed in tapping off from time to time the contents of the furnace. As the ore charge is fed to the furnace the high temperature causes the sodium to distill off rapidly along with the carbonic oxid produced by the reduction of the oxid of aluminium. These gaseous products passing through the porous carbon walls of the furnace into the condenser R, formed between the said walls and the water or air jacket, being strained from dust in their passage through said carbon walls, the vapor of sodium is condensed in the condensing chamber or space R, whence it is drawn off in liquid form at proper intervals through the pipe L, while the carbonic oxid, being condensed, passes off through the outlet-pipe F. The space or condensing-chamber R is kept at a temperature above 96° centigrade, at which temperature sodium is liquefied; but by means of the water-jacket it is kept below the temperature (red heat) at which sodium is volatile. The interior of the furnace is maintained at a very high temperature, reaching incandescence on the inner surface of the carbon wall and decreasing to a dull red heat at the iron casing. By this means sodium is prevented from condensing in the furnace and any possibility of short-circuiting arising from condensed sodium condensing on the inner walls of the furnace at the junction of the cover and body-wall or elsewhere is prevented, although such short-circuiting could not occur to an extent to materially affect the operation, since the sodium in such case would be instantly volatilized by the heat of the current shunted through it.

The gases evolved in the furnace during the operation create a pressure within the furnace, which will be indicated to the operator by the pressure-gage P, and although there is very little, if any, danger of the pressure reaching a point where any injury to the apparatus could occur therefrom, yet the possibility thereof is fully obviated by providing the safety-valve O. This pressure in the furnace materially assists in driving through the porous carbon wall of the furnace the volatilized sodium vapor and the gases evolved in the operation.

The oxid of aluminium left by driving off the sodium from the aluminate is acted upon and reduced by the carbon, the reaction yielding carbonic oxid and carbid of aluminium, the carbonic oxid passing through the walls of the furnace and the aluminium carbid remaining and accumulating in the bottom of the furnace, from which it is at suitable intervals drawn off through the opening K.

By adding through the ore charge or otherwise in reducing it in the furnace a metal less volatile than sodium—as, for instance, iron, copper, or tin—an alloy of the reduced aluminium with such metal is obtained. Further, by adding in the same manner a volatile metal, such as zinc, there will be obtained in the condenser an alloy of sodium with such other volatile metal, all of such operations, reactions, and reductions being successfully carried out by this furnace.

It is advisable to heat up the furnace to a high temperature before adding the ore to be reduced, which is readily done by putting in a quantity of granular carbon in the bottom of the furnace to save the carbon lining of the furnace and allowing the arc to play thereon, one advantage of which is that by previously raising the furnace to a temperature so high that the ore will reduce rapidly a more perfect operation is secured at more economical expense. The charge fed into the furnace should be proportionate to the electrical energy delivered to the furnace, the best results being obtained when the electric current and the feed of ore are so proportioned that the ore is reduced as fast as fed in and the process of reduction conducted in a substantially continuous manner.

By mixing sodium compounds with calcium compounds and the proper proportion of carbon there may be obtained sodium, volatilized and condensed in the condenser, and calcium carbid remaining in the furnace.

I do not limit myself to a water or air jacket surrounding the furnace, though the use of such enables the maintaining of a better control over the process that may be carried on in this furnace; but such jacket may be dispensed with and the atmosphere of the room or other compartment containing the furnace may be kept in condition to cause a sufficient cooling surface with a properly-regulated delivery of electric energy to the furnace.

Having described my invention, what I claim is—

1. An electric furnace having a wall permeable to vapors and gases, and a condensing-chamber outside of said permeable wall.

2. An electric furnace having a closed furnace-chamber the walls of which are permeable to vapors and gases, and a condensing-chamber outside of the said walls.

3. An electric furnace having furnace-chamber walls and hearth permeable to vapors and gases, and a condensing-chamber surrounding the exterior of said walls and hearth.

4. The combination, with a porous furnace-chamber wall permeable to vapors and gases, of a water-jacket surrounding the exterior of said wall to form a condensing-chamber between the wall and the jacket.

5. The combination, with an electric furnace, the furnace-chamber walls of which are composed of carbon permeable to vapors and gases, of a cooling-jacket outside of the walls, and means for electrically connecting the jacket with the exterior of the said walls to form a condensing space or chamber between the jacket and the walls.

6. In an electric furnace the combination, with the porous carbon forming the furnace-chamber and enabling the gases to pass therefrom to the exterior surface of the chamber, of a cooling-jacket covering the exterior of said chamber, and a condensing space or chamber between the jacket and the said exterior surface.

7. The combination, with the porous-walled furnace-chamber having a condensing-chamber surrounding it, and a compacted carbon top provided with a feed-hopper, of a gas-tight pipe attached to the said top, and the electrode passing through said top and working in said pipe.

In witness whereof I hereunto set my hand in the presence of two witnesses.

ALFRED H. COWLES.

Witnesses:
  EUGENE L. POMEROY,
  NELLIE WILLS WELCH.